(12) United States Patent
Chizuka

(10) Patent No.: US 10,876,239 B2
(45) Date of Patent: Dec. 29, 2020

(54) PRIMARY BASE FABRIC FOR TUFTED CARPET, AND METHOD OF MANUFACTURING SAME

(71) Applicant: UNITIKA LTD., Hyogo (JP)

(72) Inventor: Kenji Chizuka, Aichi (JP)

(73) Assignee: Unitika Ltd., Hyogo (JP)

(*) Notice: Subject to any disclaimer, the term of this patent is extended or adjusted under 35 U.S.C. 154(b) by 148 days.

(21) Appl. No.: 16/090,327

(22) PCT Filed: Apr. 10, 2017

(86) PCT No.: PCT/JP2017/014613
§ 371 (c)(1),
(2) Date: Oct. 1, 2018

(87) PCT Pub. No.: WO2017/179519
PCT Pub. Date: Oct. 19, 2017

(65) Prior Publication Data
US 2019/0112740 A1 Apr. 18, 2019

(30) Foreign Application Priority Data
Apr. 11, 2016 (JP) .................. 2016-078537

(51) Int. Cl.
*D05C 17/00* (2006.01)
*A47G 27/02* (2006.01)
(Continued)

(52) U.S. Cl.
CPC .......... *D05C 17/023* (2013.01); *A47G 27/02* (2013.01); *B32B 5/08* (2013.01); *B32B 5/26* (2013.01);
(Continued)

(58) Field of Classification Search
CPC .... D05C 17/00; D05C 17/023; D05C 17/026; D05C 17/006; D05C 17/0068;
(Continued)

(56) References Cited

U.S. PATENT DOCUMENTS 4,123,577 A * 10/1978 Port ................. D05C 15/00
428/95
4,288,484 A * 9/1981 Norota ............... B01D 39/08
264/46.1
(Continued)

FOREIGN PATENT DOCUMENTS

CN 101668889 3/2010
CN 102747578 10/2012
(Continued)

OTHER PUBLICATIONS

International Search Report in corresponding PCT application No. PCT/JP2017/014613, dated Jun. 27, 2017.
(Continued)

*Primary Examiner* — Ismael Izaguirre
(74) *Attorney, Agent, or Firm* — Fildes & Outland, P.C.

(57) ABSTRACT

A primary base fabric for a tufted carpet includes a first non-woven web and a second non-woven web laminated on each other. The first non-woven web is constituted with a first constituent fiber formed with a first thermoplastic resin and containing carbon. The second non-woven web is constituted with a second constituent fiber formed with a second thermoplastic resin and having a carbon content lower than the carbon content of the first constituent fiber or containing no carbon. The primary base fabric is a product prepared by combining the first non-woven web and the second non-woven web through an emboss processing.

8 Claims, 1 Drawing Sheet

(51) Int. Cl.
  *B32B 5/08* (2006.01)
  *B32B 5/26* (2006.01)
  *B60N 3/04* (2006.01)
  *D05C 17/02* (2006.01)
  *D04H 1/4242* (2012.01)
  *D04H 1/541* (2012.01)
  *D04H 1/559* (2012.01)
  *D06N 7/00* (2006.01)
  *B32B 38/06* (2006.01)

(52) U.S. Cl.
  CPC ............... *B32B 38/06* (2013.01); *B60N 3/04* (2013.01); *D04H 1/4242* (2013.01); *D04H 1/541* (2013.01); *D04H 1/559* (2013.01); *D05C 17/026* (2013.01); *D06N 7/006* (2013.01); *D06N 7/0068* (2013.01)

(58) Field of Classification Search
  CPC .... D05C 15/14; A47G 27/02; A47G 27/2043; B32B 5/00; B32B 5/08; B32B 5/26; B32B 5/022; B32B 5/14; B32B 7/00; B32B 7/02; B32B 9/007; B32B 27/00; B32B 27/08; B32B 37/00; B32B 37/02; B32B 37/10; B32B 38/06; B32B 2313/04; B60N 3/04; B60N 3/042; D04H 1/4242; D04H 1/541; D04H 1/559; D06N 7/006; D06N 7/0068; D06N 2201/087
  See application file for complete search history.

(56) References Cited

U.S. PATENT DOCUMENTS

| | | | | |
|---|---|---|---|---|
| 5,908,524 | A * | 6/1999 | Masui | B29C 51/082 156/212 |
| 6,316,088 | B1 * | 11/2001 | Ogawa | C09J 11/08 428/297.4 |
| 2001/0007066 | A1 * | 7/2001 | Mizutani | A61F 13/5123 604/372 |
| 2001/0029141 | A1 * | 10/2001 | Mizutani | A61F 13/51121 442/327 |
| 2010/0105273 | A1 * | 4/2010 | Motomura | D04H 3/005 442/329 |
| 2011/0014431 | A1 * | 1/2011 | Fowler | B32B 5/022 428/172 |
| 2016/0145410 | A1 | 5/2016 | Kondo et al. | |

FOREIGN PATENT DOCUMENTS

| | | |
|---|---|---|
| CN | 204318220 | 5/2015 |
| CN | 105431475 | 3/2016 |
| EP | 1 130 149 | 9/2001 |
| JP | 57-196186 | 6/1982 |
| JP | 2001-181956 | 7/2001 |
| JP | 2013-27660 | 2/2013 |
| JP | 5361863 | 12/2013 |
| WO | 2008/131883 | 11/2008 |

OTHER PUBLICATIONS

English language machine translation of JP 57-196186.
English language machine translation of JP 2001-181956.
English language machine translation of JP 2013-27660.
Chinese Office Action dated Jul. 29, 2019 in corresponding Chinese Patent Application No. 201780014307.9 and English language translation.
English language abstract and machine translation of CN 204318220.
Chinese Office Action dated Apr. 2, 2020 in corresponding Chinese Patent Application No. 201780014307.9 and English language translation.
English language abstract and machine translation of CN 102747578.
Supplementary European Search Report in EP 17 78 2332.5 dated Nov. 30, 2018.
Abstract from Database WPI; Week 200279 2002 Thomson Scientific, London, GB, XP-002786726.

* cited by examiner

PRIMARY BASE FABRIC FOR TUFTED CARPET, AND METHOD OF MANUFACTURING SAME

TECHNICAL FIELD

The present invention relates to a primary base fabric for a tufted carpet, and a method of manufacturing the same.

BACKGROUND ART

It has been known that a filament non-woven fabric is used as a primary base fabric of a tufted carpet. The primary base fabric is used as a support when pile yarns are tufted, namely, pile yarns are implanted. In a manufacturing process of a carpet, a gray fabric is obtained tufting a primary base fabric by using a desired pile yarn. Then, the gray fabric is subjected to a backing treatment, and thus a carpet is obtained. The obtained carpet is subjected to a desired molding if necessary.

As a this type of primary base fabric for a tufted carpet, Patent Literature 1 describes a non-woven fabric having a front side and a back side colored in different colors as a primary base fabric. This makes it possible to achieve, for example, a reduction of the inventory quantity required for assorting the demanded number of colors.

Patent Literature 2 also describes a base fabric (lining fabric material) for a tufted carpet being different in the colors of the front and back sides.

Patent Literature 1 and Patent Literature 2 each describe the lamination of two non-woven fabrics constituted with fibers different in color, in order to allow the colors of the front side and the back side of a primary base fabric for a tufted carpet to be different from each other.

CITATION LIST

Patent Literature

Patent Literature 1: JP-U-H57-196186A
Patent Literature 2: WO2008/131883

SUMMARY OF INVENTION

Technical Problem

However, for example, when two non-woven fabrics constituted with fibers different in color from each other are laminated on each other by using an adhesive, the two non-woven fabrics are frequently different in the adhesion property with respect to the two non-woven fabrics. Consequently, in most cases, it is difficult to manufacture non-woven fabrics satisfactorily laminated and unified. In addition, in the case where satisfactory unification is not achieved, in a subsequent tufting step of implanting pile yarns, the two non-woven fabrics undergo delamination and separation, and sometimes the two non-woven fabrics cannot sufficiently exert the original function as a support for pile yarns.

Thus, an object of the present invention is to allow these non-woven fabrics to be satisfactorily laminated and unified when two non-woven fabrics constituted with fibers different in color from each other are laminated on each other, in order to allow the colors of the front side and the back side of a primary base fabric for a tufted carpet to be different from each other, by solving such problems as described above.

Solution to Problem

In order to achieve this object, the gist of the present invention is as follows.

(1) A primary base fabric for a tufted carpet including a first non-woven web and a second non-woven web laminated on each other, wherein the first non-woven web is constituted with a first constituent fiber formed with a first thermoplastic resin and containing carbon;

the second non-woven web is constituted with a second constituent fiber formed with a second thermoplastic resin and having a carbon content lower than the carbon content of the first constituent fiber or containing no carbon; and the primary base fabric is a product prepared by unifying the first non-woven web and the second non-woven web through an emboss processing.

(2) The primary base fabric for a tufted carpet according to (1), wherein in each of the first and second constituent fibers, a low-melting point resin having a lower melting point than the melting point of the resin of the core is arranged around the resin of the core; and in the primary base fabric, the constituent fibers are mutually bonded through the melting and the solidification of the low-melting point resin in emboss portions in emboss processing.

(3) The primary base fabric for a tufted carpet according to (1) or (2), wherein the peel strength between the first non-woven web and the second non-woven web is 2.0 N/50 mm width or more.

(4) The primary base fabric for a tufted carpet according to any one of (1) to (3), wherein the surface of the first non-woven web has the processing traces due to a flat roll for an emboss processing, and the surface of the second non-woven web has the processing traces due to an emboss roll for the emboss processing.

(5) A method of manufacturing a primary base fabric for a tufted carpet, wherein when the primary base fabric for a tufted carpet according to any one of (1) to (4) is manufactured, the first non-woven fabric and the second non-woven fabric are laminated on each other; and the first non-woven web is arranged on the flat roll side and the second non-woven web is arranged on the emboss roll side, and then the laminated first non-woven fabric and the laminated second non-woven fabric are made to pass between the flat roll and the emboss roll to perform an emboss processing.

Advantageous Effects of Invention

The primary base fabric of a tufted carpet of the present invention is obtained by unifying the first non-woven web and the second non-woven web different in carbon content from each other, and by regulating the treatment temperature and the treatment pressure, being typical processing conditions for unification based on emboss processing, a satisfactory unification can be achieved although the carbon contents are different from each other. Consequently, according to the present invention, when the two non-woven webs constituted with fibers different in color from each other due to the carbon contents different from each other, these non-woven webs are satisfactorily laminated on each other and unified, and thus a primary base fabric for a tufted carpet can be obtained.

DESCRIPTION OF EMBODIMENTS

Figure 1:
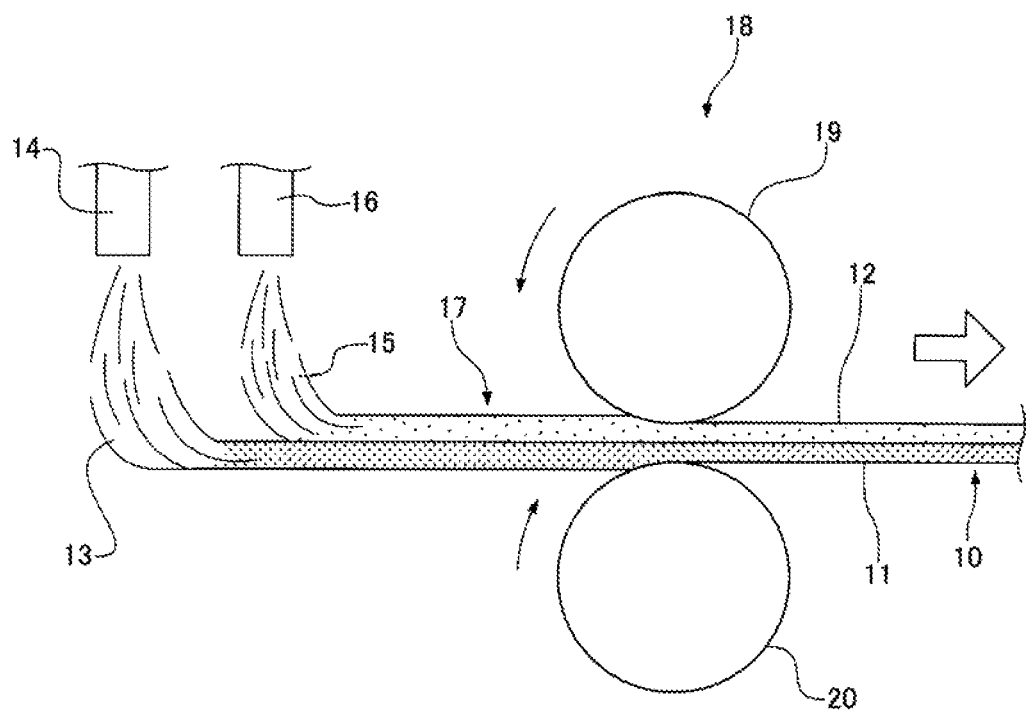
FIG. 1 is a diagram illustrating the primary base fabric for a tufted carpet of the embodiment of the present invention, and the method of manufacturing the same.

As shown in FIG. 1, the primary base fabric 10 for a tufted carpet of the embodiment of the present invention has a structure in which the first non-woven web 11 and the second non-woven web 12 are laminated on each other to be unified. The first non-woven web 11 has a constitution in which the constituent fiber is formed with a thermoplastic resin, and the constituent fiber contains carbon. The second non-woven web 12 has a constitution in which the constituent fiber is similarly formed with a thermoplastic resin, but the content of carbon in the constituent fiber is lower than the content of carbon in the first non-woven web 11, or the constituent fiber does not contain carbon.

When such a primary base fabric 10 of a tufted carpet is manufactured, for example, as shown in FIG. 1, the first constituent fiber 13 is discharged from a nozzle 14 to form the first non-woven web 11, and the second constituent fiber 15 is discharged from a second nozzle 16 to laminate the second non-woven web 12 on the first non-woven web 11.

Then, the laminate 17 obtained in this way is made pass through an emboss processing apparatus 18 capable of performing a high-temperature and high-pressure emboss processing for the laminate 17. The emboss processing apparatus 18 has an emboss roll 19 and a flat roll 20. These rolls 19 and 20 are arranged in such a way that the first non-woven web 11 touches the flat roll 20, and at the same time, the second non-woven web 12 touches the emboss roll 19.

The first and second constituent fibers 13 and 15 may each be a single-phase-type fiber, or a composite type fiber obtained by combining two thermoplastic resins. Preferable is a core-sheath composite fiber in which a high-melting-point polymer is arranged in the core, and a low-melting-point polymer is arranged around the core. In particular, preferable is a core-sheath composite fiber having a cross-sectional structure shown in FIG. 2, namely, a core-sheath type multilobate cross-sectional structure having a core 22, and lobe parts 23 surrounding the core 22 to represent a multilobate shape. The core 22 is formed with a high-melting-point polymer, and the lobe parts 23 are formed with a polymer having a melting point lower than the melting point of the polymer of the core 22.

Examples of the combination of a high-melting-point polymer and a low-melting-point polymer include: high-melting-point polyester/low-melting-point polyester, polyester/polyamide, polyester/polyolefin, and high-melting-point polyamide/low-melting-point polyamide. As the polyester, polyethylene terephthalate and polybutylene terephthalate are preferably used; and moreover, the combinations of polyethylene terephthalate/polybutylene terephthalate, polyethylene terephthalate/copolymerized polyester (a resin containing ethylene terephthalate as a main repeating unit, and a third component as a copolymerized component) can be preferably used.

When the laminate 17 obtained by laminating the first and second non-woven webs 11 and 12 constituted with such constituent fibers 13 and 15 is made to pass through the emboss processing apparatus 18, by appropriately setting the temperature condition and the pressure condition, the lobe parts 23 of the constituent fibers 13 and 15 are melted or softened, and the cores 22 of the constituent fibers 13 and 15 are not melted and not softened, and can maintain the fiber forms. Consequently, the lobe parts 23 of the adjacent constituent fibers 13 and 15 are bonded to each other, thus the constituent fibers of the first non-woven web 11 are mutually unified, the constituent fibers of the second non-woven web 12 are also mutually unified, and at the same time, the first non-woven web 11 and the second non-woven web 12 are mutually unified to manufacture the primary base fabric 10.

Specifically, in the obtained primary base fabric 10, the constituent fibers are mutually melted and solidified, namely, thermally adhere in the emboss portion, namely, a large number of discrete spot portions, and in the portions other than the spot portions, the primary base fabric 10 is maintained in a free state free from thermal adhesion. In addition, as described above, the laminate 17 is made to pass through the emboss processing apparatus 18 in such a way that the first non-woven web 11 touches the flat roll 20, and the second non-woven web 12 touches the emboss roll 19, and accordingly, in the obtained primary fabric 10, the surface of the first non-woven web 11 has the processing traces due to the flat roll 20 for the emboss processing, and the surface of the second non-woven web 12 has the processing traces due to the emboss roll 19 for the emboss processing. In other words, on the surface of the second non-woven web 12, portions composed of a large number of conspicuous discrete spots, also referred to as the partial thermal compression bonded portions, are identified. On the other hand, such a conspicuous appearance is not observed on the surface of the first non-woven web 11, as compared with the surface configuration of the second non-woven web 12.

The obtained primary base fabric 10 is described. As described above, because the second non-woven web 12 has a lower carbon content than the carbon content of the first non-woven web 11, or does not contain carbon, the first non-woven web 11 exhibits a black color or a dark gray color, and the second non-woven web 12 exhibits a paler gray color or a white color. Consequently, it is possible to obtain a primary base fabric 10 exhibiting a black color or gray colors different in density, or a white color on the front and back side thereof. In this case, the first non-woven web 11 having a higher carbon content is more flexible than the second non-woven web 12.

In the case where the laminate 17 composed of the first non-woven web 11 and the second non-woven web 12 different in carbon content from each other is made to pass through the emboss processing apparatus 18, when the processing conditions, namely, the temperature condition and the pressure condition are not satisfactorily regulated, the bonding state between the first non-woven web 11 and the second non-woven web 12 comes to be insufficient, and delamination tends to occur between both non-woven webs particularly at the time of tufting processing of implanting pile yarns in the primary base fabric 10. This is because the non-woven webs formed with thermoplastic resins change the thermal conductivities due to the values of the contents of carbon better in thermal conductivity than the thermoplastic resin, in particular a non-woven fabric having a low carbon content hardly conducts heat, and consequently the thermal adhesiveness between different non-woven webs is decreased.

In order to prevent the occurrence of such a situation, in the emboss processing apparatus 18 shown in FIG. 1, for example, when the laminate 17 composed of a first non-woven web 11 exhibiting a dark gray color and a second non-woven web 12 exhibiting a paler gray color is subjected to an emboss processing, an emboss processing is performed under the conditions of any one of (i) a further higher temperature, (ii) a further higher pressure and (iii) a further higher temperature and a further higher pressure than the temperature condition and/or the pressure condition at the time of applying an emboss processing to a single layer of the second non-woven web 12 exhibiting a paler gray color, in which the condition for the second non-woven web is to be higher in temperature and higher in pressure than the temperature condition and the pressure condition at the time of applying an emboss processing to a single layer of the first non-woven web 11 exhibiting a dark gray color. It is to be noted that when the temperature is set at a high temperature in this case, at least the emboss roll is set at a high temperature, and both of the emboss roll and the flat roll are each preferably set at a high temperature.

By setting the conditions as described above, there is obtained a primary base fabric 10 for a tufted carpet constituted with a reversible laminated non-woven fabric with one face and the other face different from each other in color, and being effectively prevented from the occurrence of the delamination between the layers.

The primary base fabric for a carpet of the present invention, constituted with a laminated non-woven fabric preferably has a peel strength of 2.0 N/50 mm width or more between the two layers composed of the first non-woven web and the second non-woven web. When the peel strength is less than 2.0 N/50 mm width, for example, the pressure bonding between the two layers is insufficient, the base fabric is delaminated into two layers in the tufting step, and the base fabric becomes fluffy, and accordingly, the base fabric fibers are liable to come out between the tuft yarns to the surface, or the grip force of the tuft yarn is liable to be decreased. The peel strength is more preferably 2.5 N/50 mm width or more.

EXAMPLES

Example 1

Figure 2:
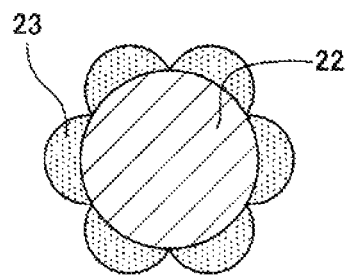
FIG. 2 is a diagram showing the cross-sectional structure of the fiber used for the primary base fabric for a tufted carpet of FIG. 1.

There was used a composite fiber having a six-lobed shape cross sectional structure shown in FIG. 2, having the core provided with a polyethylene terephthalate having a melting point of 256° C., and the lobes provided with a copolymerized polyester having a melting point of 230° C., composed of ethylene terephthalate as a main repeating unit and 8 moles of copolymerized isophthalic acid. In the composite fiber, the mass ratio between the core and the sheath was (core)/(sheath)=6/4. The fineness of the composite fiber was 5 dtex.

By using the first constituent fiber having such a composite fiber form as described above and a carbon content of 0.35% by mass both in the core and in the lobes, and the second constituent fiber having such a composite fiber form as described above and a carbon content of 0.05% by mass both in the core and in the lobes, a first dark gray non-woven web and a second pale gray non-woven web, each having a basis weight of 60 g/m$^2$ were obtained.

The first and second non-woven webs were laminated on each other, and the obtained laminate was made to pass through an emboss processing apparatus (an apparatus composed of an emboss roll and a flat roll). In the processing apparatus, the second non-woven web low in carbon content and accordingly colored in a pale gray was arranged on the emboss roll side, and the first non-woven web high in carbon content and accordingly colored in a dark gray was arranged on the flat roll side.

The conditions of the emboss processing were as follows. Specifically, if the second non-woven web is a single layer, optimal are the conditions of a higher temperature and a higher pressure as compared with a case where the first non-woven web being high in carbon content and accordingly satisfactory in thermal conductivity is a single layer, for example, a temperature of 200° C., and a linear pressure of 22 kg/cm. However, for the above-mentioned laminate, the conditions of a higher temperature of 213° C., and a linear pressure of 22 kg/cm were applied. It is to be noted that the temperature as referred to herein is the surface temperature of each of both rolls in the emboss processing apparatus.

In this way, the primary base fabric for a tufted carpet of Example 1 in which the first non-woven web and the second non-woven web were firmly unified was obtained. The peel strength of the obtained primary base fabric was 2.6 N/50 mm width. When the peel strength was measured, a sample was prepared by cutting out a piece of 50 mm in width and 300 mm in length from the obtained primary base fabric, and the two layers of the sample were separated, in a length of 100 mm from a short side edge, between the layers of the first non-woven web and the second non-woven web. Then, by using a tensile tester (Tensilon®-500, manufactured by Toyo Baldwin Co., Ltd.), the sample was pulled at a tensile rate of 100 mm/min. From the obtained elongation percentage-strength plot, the three highest strength maximum values (peak extrema) and the three lowest strength minimum values (peak extrema) were read out, and the average value of these values was adopted as the peel strength between the two layers.

In addition, the primary base fabric for a tufted carpet obtained under the conditions of a further higher temperature of 216° C. and a further higher pressure of a linear pressure of 43 kg/cm gave a peel strength of 3.9 N/50 mm width.

Example 2

The emboss processing conditions were altered from the conditions of the temperature of 213° C. and the linear pressure of 22 kg/cm in Example 1 to the optimal conditions of a temperature of 200° C. and a linear pressure of 22 kg/cm in the above-mentioned case where the second non-woven web is a single layer. And, otherwise in the same manner as in Example 1, the primary base fabric for a tufted carpet of Example 2 was obtained. The peel strength of the obtained primary base fabric was measured under the same conditions as in Example 1, and was found to be 1.7 N/50 mm width.

Comparative Example 1

Two sheets of the second non-woven web (the carbon content in the core and the lobes were each 0.05% by mass, the basis weight of the non-woven fabric was 60 g/m$^2$) used in Example 1 were laminated, and the obtained laminate was made to pass through the emboss processing apparatus. The emboss processing conditions were the above-mentioned optimal conditions of a temperature of 200° C. and a linear pressure of 22 kg/cm. The peel strength of the obtained base fabric was satisfactorily 2.4 N/50 mm width; however, the front and back sides of the obtained base fabric were the same in color, in contrast to the primary base fabric of the present invention having different colors on the front side and the back side thereof.

The invention claimed is:

1. A primary base fabric for a tufted carpet comprising a first non-woven web and a second non-woven web laminated on each other,
    wherein the first non-woven web is constituted with a first constituent fiber formed with a first thermoplastic resin and containing carbon in addition to the first thermoplastic resin, thereby exhibiting a black color or a dark gray color due to the carbon;
    the second non-woven web is constituted with a second constituent fiber formed with a second thermoplastic resin and containing carbon in addition to the second thermoplastic resin or containing no carbon in addition to the second thermoplastic resin;
    the second non-woven web having a carbon content lower than the carbon content of the first constituent fiber or containing no carbon in addition to the second thermoplastic resin, thereby exhibiting a paler gray color due to the carbon or a white color; and
    the primary base fabric is a product prepared by unifying the first non-woven web and the second non-woven web through an emboss processing.

2. The primary base fabric for a tufted carpet according to claim 1,
    wherein in each of the first and second constituent fibers, a low-melting point resin having a lower melting point than the melting of the resin of a core is arranged around the resin of the core; and
    in the primary base fabric, the constituent fibers are mutually bonded through the melting and the solidification of the low-melting point resin in emboss portions in emboss processing.

3. A method of manufacturing a primary base fabric for a tufted carpet,
    wherein when the primary base fabric for a tufted carpet according to claim 2 is manufactured,
    the first non-woven fabric and the second non-woven fabric are laminated on each other; and
    the first non-woven web is arranged on the flat roll side and the second non-woven web is arranged on the emboss roll side, and then the laminated first non-woven fabric and the laminated second non-woven fabric are made to pass between the flat roll and the emboss roll to perform an emboss processing.

4. The primary base fabric for a tufted carpet according to claim 1, wherein the peel strength between the first non-woven web and the second non-woven web is 2.0 N/50 mm width or more.

5. A method of manufacturing a primary base fabric for a tufted carpet,
    wherein when the primary base fabric for a tufted carpet according to claim 4 is manufactured,
    the first non-woven fabric and the second non-woven fabric are laminated on each other; and
    the first non-woven web is arranged on the flat roll side and the second non-woven web is arranged on the emboss roll side, and then the laminated first non-woven fabric and the laminated second non-woven fabric are made to pass between the flat roll and the emboss roll to perform an emboss processing.

6. The primary base fabric for a tufted carpet according to claim 1, wherein the surface of the first non-woven web has the processing traces due to a flat roll for an emboss processing, and the surface of the second non-woven web has the processing traces due to an emboss roll for the emboss processing.

7. A method of manufacturing a primary base fabric for a tufted carpet,
    wherein when the primary base fabric for a tufted carpet according to claim 6 is manufactured,
    the first non-woven fabric and the second non-woven fabric are laminated on each other; and
    the first non-woven web is arranged on the flat roll side and the second non-woven web is arranged on the emboss roll side, and then the laminated first non-woven fabric and the laminated second non-woven fabric are made to pass between the flat roll and the emboss roll to perform an emboss processing.

8. A method of manufacturing a primary base fabric for a tufted carpet,
    wherein when the primary base fabric for a tufted carpet according to claim 1 is manufactured,
    the first non-woven fabric and the second non-woven fabric are laminated on each other; and
    the first non-woven web is arranged on the flat roll side and the second non-woven web is arranged on the emboss roll side, and then the laminated first non-woven fabric and the laminated second non-woven fabric are made to pass between the flat roll and the emboss roll to perform an emboss processing.

* * * * *